(12) United States Patent
Purkiss

(10) Patent No.: US 10,234,084 B2
(45) Date of Patent: Mar. 19, 2019

(54) DUAL-HEADED WIRELESS RECHARGEABLE FLASHLIGHT

(71) Applicant: Joshua Purkiss, Chicago, IL (US)

(72) Inventor: Joshua Purkiss, Chicago, IL (US)

( * ) Notice: Subject to any disclaimer, the term of this patent is extended or adjusted under 35 U.S.C. 154(b) by 331 days.

(21) Appl. No.: 14/970,506

(22) Filed: Dec. 15, 2015

(65) Prior Publication Data
US 2017/0167669 A1    Jun. 15, 2017

(51) Int. Cl.
| | |
|---|---|
| F21L 4/02 | (2006.01) |
| F21L 4/04 | (2006.01) |
| F21L 4/08 | (2006.01) |
| H02J 7/00 | (2006.01) |
| H02J 7/02 | (2016.01) |
| F21V 23/04 | (2006.01) |
| H02J 50/10 | (2016.01) |
| F21V 21/096 | (2006.01) |

(52) U.S. Cl.
CPC ............... *F21L 4/085* (2013.01); *F21L 4/027* (2013.01); *F21L 4/045* (2013.01); *F21V 21/0965* (2013.01); *F21V 23/0414* (2013.01); *H02J 7/0044* (2013.01); *H02J 7/025* (2013.01); *H02J 50/10* (2016.02)

(58) Field of Classification Search
CPC . F21L 4/085; F21L 4/025; F21L 4/027; F21L 14/00; F21L 14/023
USPC ........................................ 362/183, 184, 187
See application file for complete search history.

(56) References Cited

U.S. PATENT DOCUMENTS

| | | | |
|---|---|---|---|
| 617,592 A | 1/1899 | Misell | |
| 7,347,581 B2 * | 3/2008 | Krieger | F21L 4/027 320/114 |
| 8,863,366 B2 | 10/2014 | Berger | |
| 2006/0028811 A1 * | 2/2006 | Ross, Jr. | F21V 33/0052 362/157 |
| 2006/0221603 A1 * | 10/2006 | Zazzara, Sr. | F21L 2/00 362/187 |
| 2006/0232239 A1 * | 10/2006 | Maglica | H02J 7/0044 320/107 |
| 2007/0109803 A1 * | 5/2007 | Chuang | B62J 6/02 362/473 |
| 2009/0154149 A1 | 6/2009 | Huang | |
| 2012/0033415 A1 * | 2/2012 | Sharrah | F21L 4/027 362/199 |

(Continued)

*Primary Examiner* — William N Harris

(57) ABSTRACT

The dual-headed rechargeable flashlight is a compact rechargeable LED flashlight with two methods of recharging as well as two independent LED lighting sources. In one manner of recharging, the flashlight is docked into a wireless inductive charging station that is powered by a 12 volt DC power source. In the alternative manner of charging, the flashlight's power source is recharged via a mini USB port. Alternatively, in the wired mode of recharging, the flashlight is docked magnetically to an external battery pack that can be easily secured to tactical vests using straps or clips. When using the wearable vest battery pack, the operator has access to the flashlight while it is simultaneously being recharged. The flashlight additionally furnishes a secondary auxiliary LED light located inside the rear end cap, and provides a battery power status meter for monitoring battery life. The wireless charging dock is designed for use within motor vehicles that possess 12 volt DC power adapters, and includes a way for a secure attachment of the flashlight when docked.

10 Claims, 15 Drawing Sheets

(56) References Cited

U.S. PATENT DOCUMENTS

2014/0197781 A1\* 7/2014 Maglica ............... H02J 7/0042
320/107
2017/0167706 A1\* 6/2017 Yang ................. F21V 23/0428

\* cited by examiner

US 10,234,084 B2

DUAL-HEADED WIRELESS RECHARGEABLE FLASHLIGHT

FIELD OF THE INVENTION

The present invention relates to the field of battery powered flashlights, particularly to a flashlight that utilizes several unique capabilities regarding power management, light distribution, and recharging.

BACKGROUND OF THE INVENTION

It is an established fact that the first patented flashlight was granted to British inventor David Misell (U.S. Pat. No. 617,592), on Jan. 10, 1899. Misell's flashlight was powered by "D" type batteries and was laid front to back in a paper tube. Misell's flashlight was powered a single light bulb, and had a brass reflector at the distal end. Since that time, there have been several flashlight designs, patented with improvements such as LEDs to replace the incandescent light bulb, as well as other upgraded variants of design, like adjustable light beam focusing and AC to DC recharging stations using USB power connections to 110V wall outlets. However, in spite of the myriad of advanced designs for the average consumer for camping or recreational usage, there has yet to have been made any significant advances in tactical flashlights, for modern military personnel or first responders.

A prevailing problem faced by both military and first responders is the dilemma of assuring that their battery powered flashlights are in fact adequately charged. If a police officer were to use a poorly charged flashlight while entering a hostile area on foot (for example, a police search warrant execution) the deficiency of proper lighting could add significant risk of injury or death in these cases where the officer(s) have reasonable belief that the suspect is armed or otherwise extremely dangerous. In the worst case, where the batteries have not been recharged at all, the officer using the single lit ends of prior art flashlights would have to then rely heavily on any available ambient lighting provided.

Another drawback seen with solar powered flashlight recharging systems is that these units can may only be recharged during the day, and can experience a significant degradation in performance if the solar cells get dirty, or over prolonged use having the solar cells scratched or broken. An additional customary drawback of the flashlights of prior art is that they fail to provide means of assessing the charge level when in actual use, as prevalent models contain LED battery gauges only at their static recharge stations.

A survey of existing flashlight patents does not reveal any prior art flashlights that have the full set of the unique capabilities of the present invention. For example, U.S. Pat. No. 8,863,366 entitled Method of Converting a Non-Rechargeable Flashlight to a Rechargeable Flashlight and issued to Berger discloses a flashlight that has a replacement tail cap with circuitry for receiving electrical power from a recharging base station for recharging the rechargeable flashlight battery. U.S. Patent Appl. No. 20090154149 entitled Inductive Flashlight Charging System with Concentric Coils and submitted by Huang discloses a flashlight that can recharge through inductive charging using a coil that is concentric with the cylindrical housing of the flashlight and which sits into a base charging station with contains the primary charging coil. Although these patent examples cited share slight elements of the present invention, they do not encompass all of the unique capabilities of the present invention. Indeed, there exists the need for a rechargeable flashlight that can better accommodate the needs of the modern day first responder and military personnel by providing innovative additional features, which shall be discussed presently.

BRIEF SUMMARY OF THE INVENTION

It is a first object of the present invention to provide a flashlight that includes a means of inductive recharging of the rechargeable battery using an inductive base recharging station.

It is yet another object of the present invention to provide a flashlight that has an alternative means of recharging using a mini USB power connection to an external rechargeable battery pack.

It is yet another object of the present invention to provide a flashlight that includes a tail cap that includes a secondary auxiliary light source powered by a separate non-rechargeable battery.

It is yet another object of the present invention to provide a flashlight and inductive base recharging station that receives power from a standard 12 VDC outlet on an automobile dashboard.

It is yet another object of the present invention to provide a flashlight and rechargeable battery pack that can be attached to the operator using a conventional belt, or another method such as MOLLE straps and clips.

It is yet another object of the present invention to provide a flashlight that includes an LED readout of the remaining battery life of the rechargeable battery.

BRIEF DESCRIPTION OF THE INVENTION

DETAILED DESCRIPTION OF THE INVENTION

Figure 1:
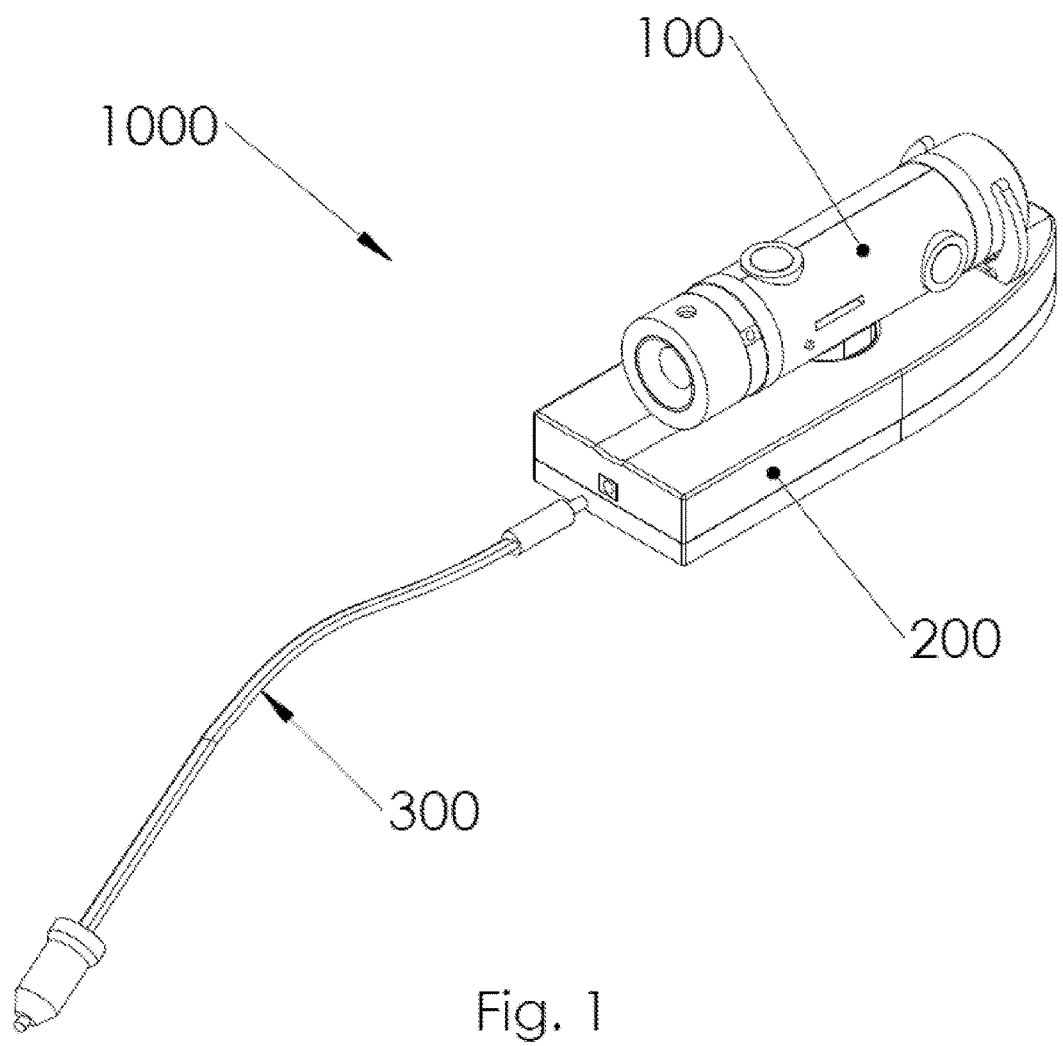
FIG. 1 is a perspective view of the primary embodiment of the wirelessly rechargeable flashlight and charger base.

Referring now to the drawings and in particular FIG. 1, a primary embodiment of the flashlight of the present invention is generally designated by reference numeral 1000. The primary embodiment contains three major components which shall next be explained in greater detail. The major components of the primary embodiment of the present invention are the dual-headed wirelessly rechargeable flashlight 100, the wireless rechargeable docking station 200 and a detachable 12 VDC power supply cord 300.

Figure 2:
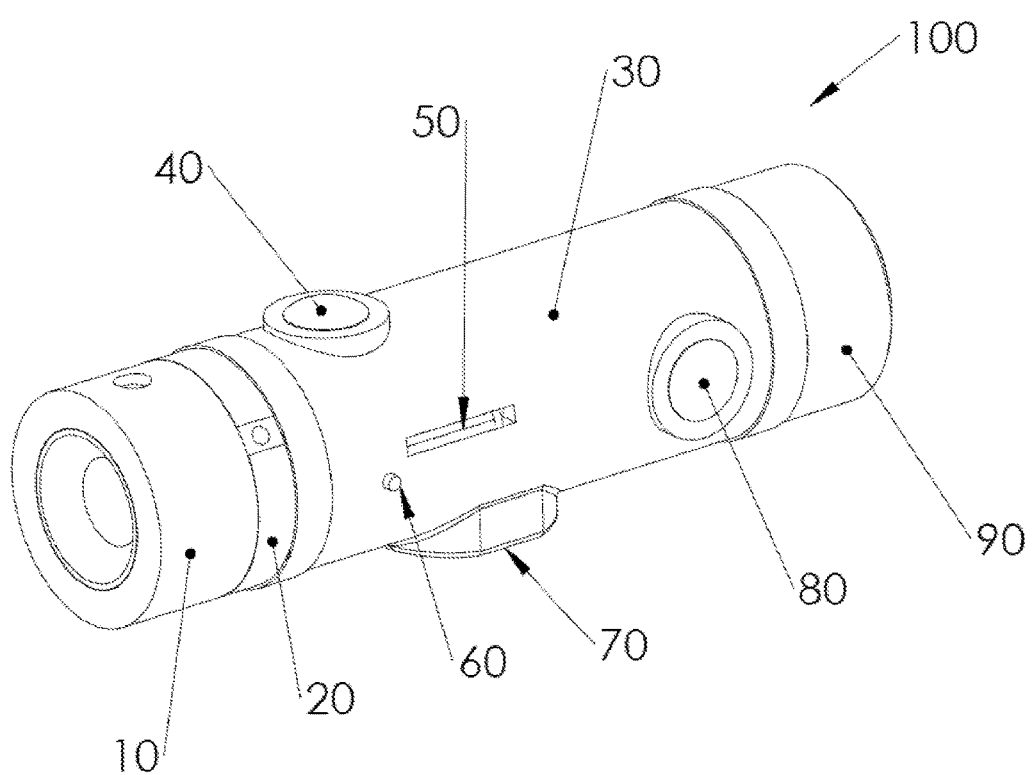
FIG. 2 is a perspective view of the wirelessly rechargeable flashlight.

Referring next to FIG. 2, the dual-headed wirelessly rechargeable flashlight 100 is next shown to illustrate the innovative features and components of the present invention. The dual-headed wirelessly rechargeable flashlight 100 consists of a main housing body 30, a front primary LED light and housing 10, an adjustable beam ring 20, a front LED light push-button switch 40, a rechargeable battery power meter and display unit 50 that monitors primary battery life in 25% increments, a switch to activate the power meter 60, a wireless recharging dock 70, a secondary (rear LED light) push-button switch 80, and finally a rear auxiliary LED light and housing 90.

Figure 3:
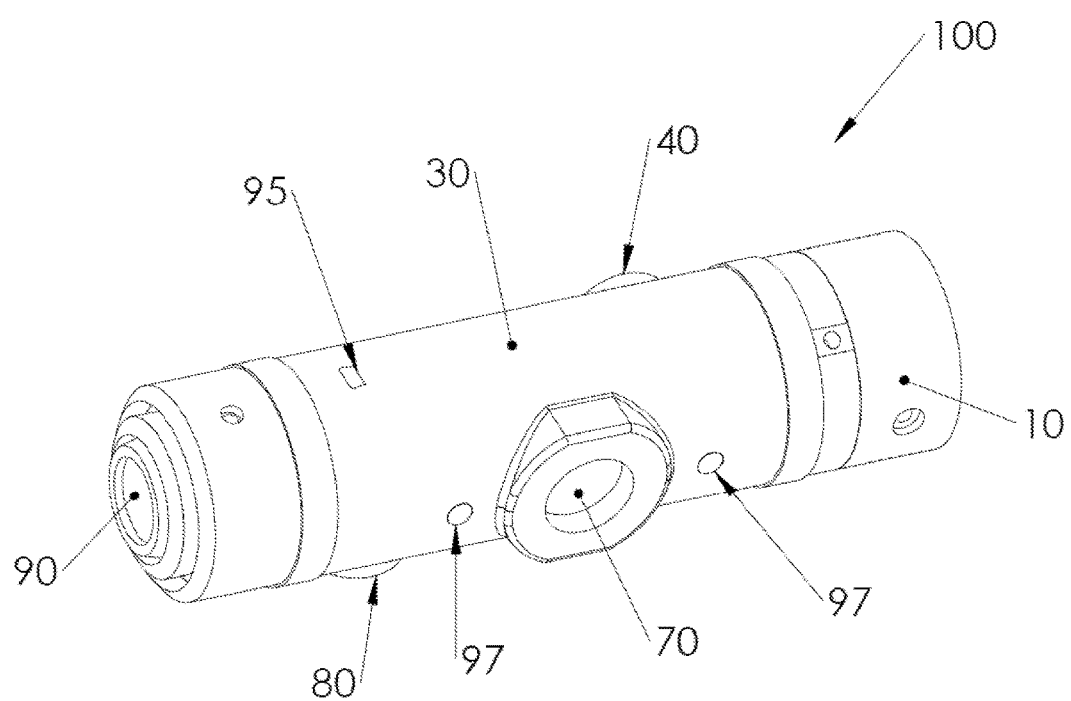
FIG. 3 is a perspective view of the underside of the wirelessly rechargeable flashlight.
Figure 4:
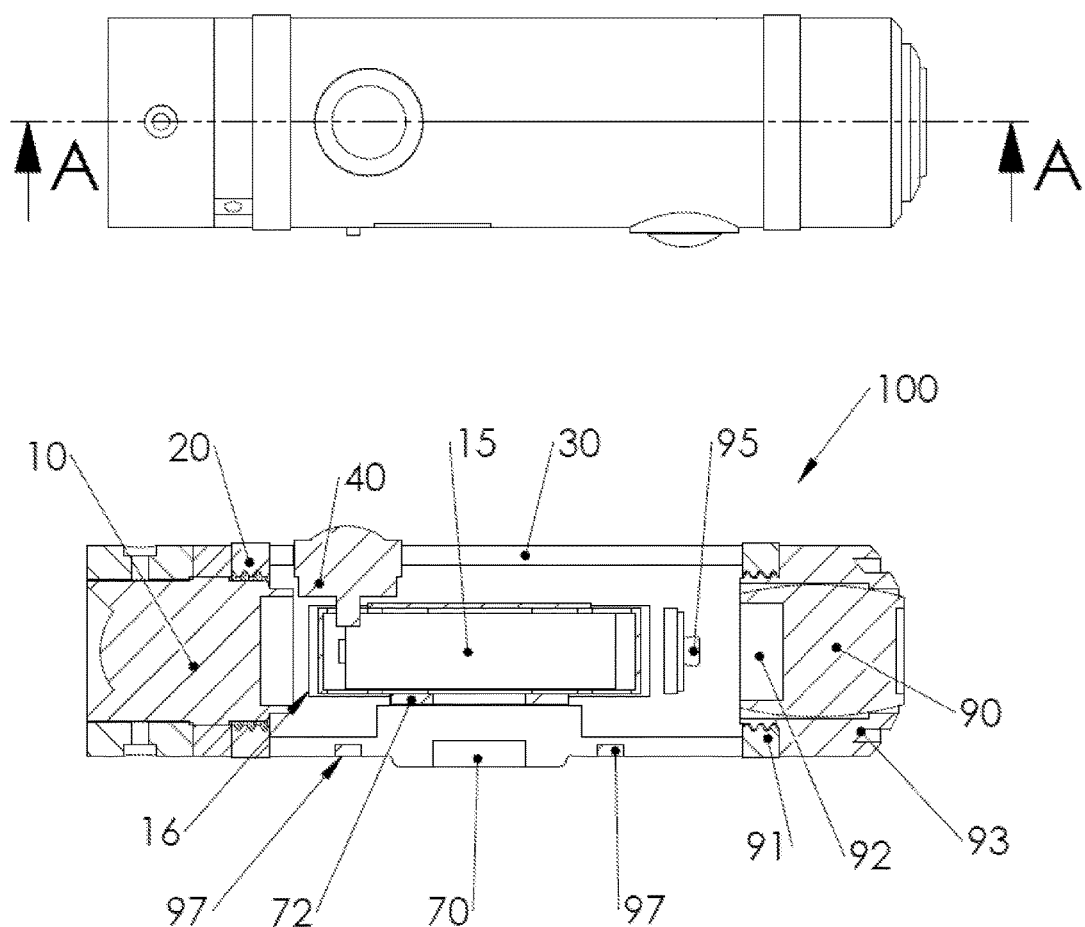
FIG. 4 is a cross sectional right half view of the wirelessly rechargeable flashlight.

Referring next to FIG. 3, the underside of the wirelessly rechargeable flashlight 100 is next shown, to illustrate the additional features that allow the flashlight to also have the option of wired recharging capability, via the preferred method of using a mini USB power cable. In this view, the auxiliary LED lamp and housing 90 is shown at the left end of the drawing and the primary LED lamp and housing 10 is shown at the right distal end. A mini USB recharging port and internal printed circuit board (PCB) 95 is shown in this view. Magnets 97 are also shown rigidly attached to main body 30 and aligned parallel to the centerline axis of the flashlight 100. The mating features of the wireless charging dock 70 can now be seen. It should be noted that there is no metal connectors required because the wireless charging port 70 uses inductive power transfer which shall be explained later in this specification. The preferred method using a female concentrically aligned pocket is shown in FIG. 3; however, one skilled in the art of making wireless connection ports may also use other shapes not shown to accomplish the same mating capability such as ovals, squares and other geometric designs.

Figure 14:
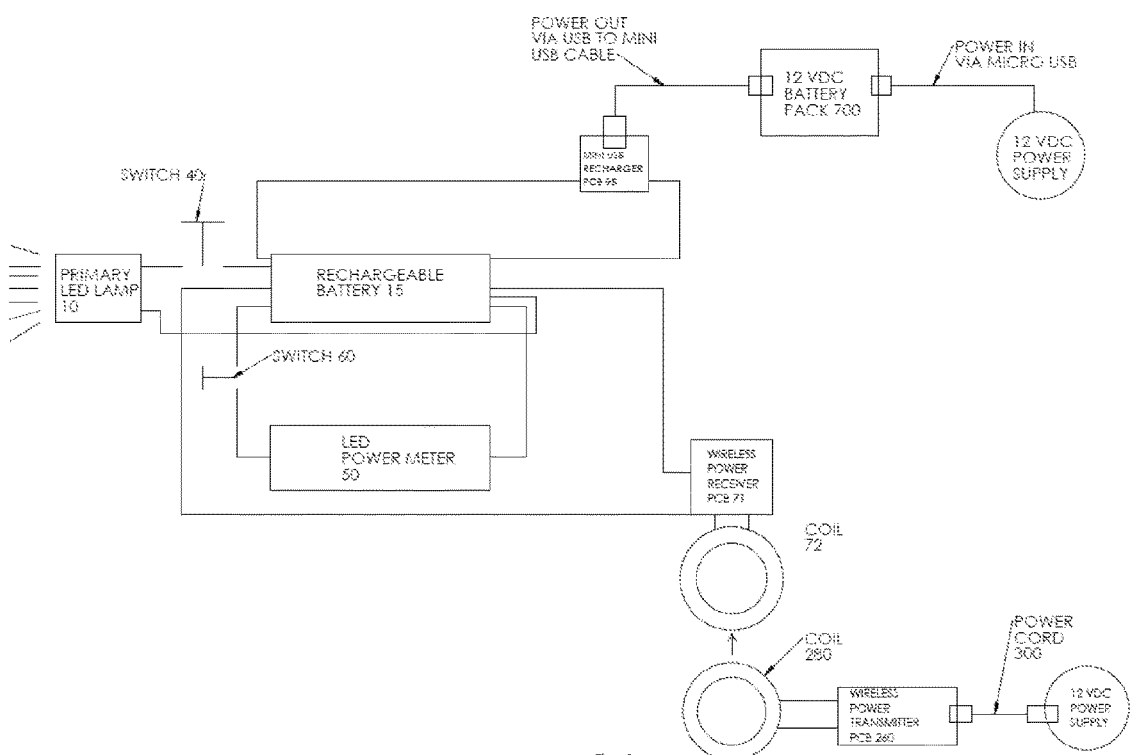
FIG. 14 is a functional block diagram of the primary LED lamp electronic relationships between the flashlight and the wireless and mini USB wired recharging options.
Figure 15:
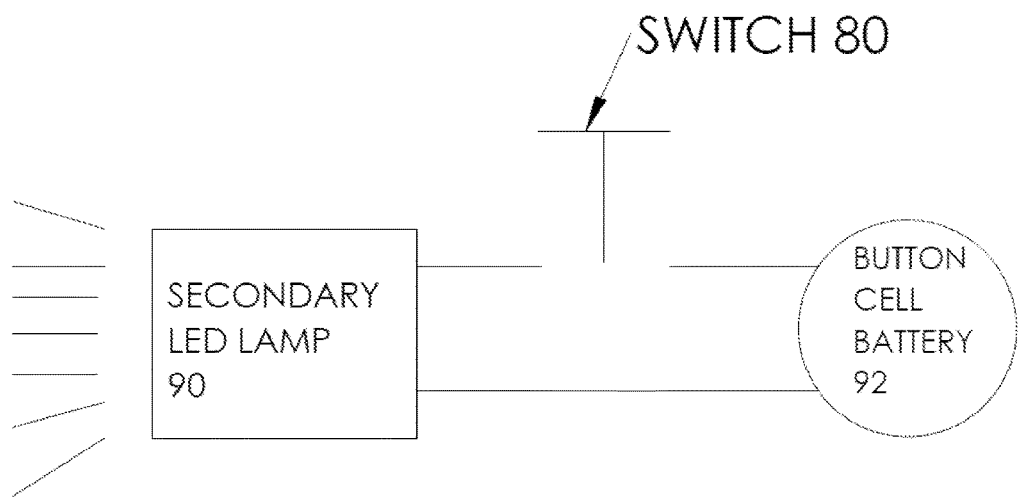
FIG. 15 is a functional block diagram of the secondary (backup) LED lamp electronic relationships between the LED lamp and its non-rechargeable power source.

Referring next to FIGS. 4, 5, 7, 14 and 15, the flashlight 100 is next shown in cross section to show the key internal components of the present invention. Also it should be noted that electrical wiring is not shown in this drawing in order to facilitate the clarity of the drawing. However, FIG. 14 is provided as a technical reference to clarify the functional electrical relations between the wireless and wired rechargeable electrical components of the main LED lamp 10, and FIG. 15 is provided as a technical reference to clarify the functional electrical relations between the non-rechargeable battery powered secondary LED lamp 90. The main LED lamp 10 is powered by internal rechargeable battery 15 which is contained in a battery housing cage 16. Power switch 40 is used to turn the main LED lamp 10 on or off with a push-button style switch being the preferred method. The status of the remaining power in the rechargeable battery 15 may be tested using the LED power meter PCB by depressing switch 60. When said battery 15 requires recharging, the present invention offers two separate modes of recharging. In the primary mode, a wireless (inductive charging) method is used by transferring power from a separate external wireless power transfer coil 280 to the internal receiver coil 72 inside the flashlight. The external power coil 280 receives its power via a wireless power transmitter PCB 260 which is powered from an external 12 VDC power supply via a detachable power cord 300. A protective rear lamp housing 93 protects the internal rear LED lamp module 90 from impact or shock damage.

Referring still to FIGS. 4, 5, 7 and 14, the internal power receiver coil 72 then converts the RF power to DC power using internal power receiver PCB 71 which is located inside said flashlight 100. In order to encourage the fastest and most efficient wireless power recharging times, there must be a modest (approximately ½ inch or less) gap between coils 72 and 280 when the flashlight is being recharged by docking to the wireless charging base 200. In the secondary mode, a wired recharging method can be used by transferring power from a separate external rechargeable battery power pack 700 to the internal mini USB receiver port 95 and integral USB power PCB 96 which are also contained within the flashlight 100. It should be noted, that these two methods may differ by ½ hour or more in their recharging times, and therefore one skilled in the arts of electrical engineering, may specify different PCB board designs to allow the flashlight 100 of the present invention to be made in several different versions which the versions offering different recharging rates for the purchaser of the product.

Figure 5:
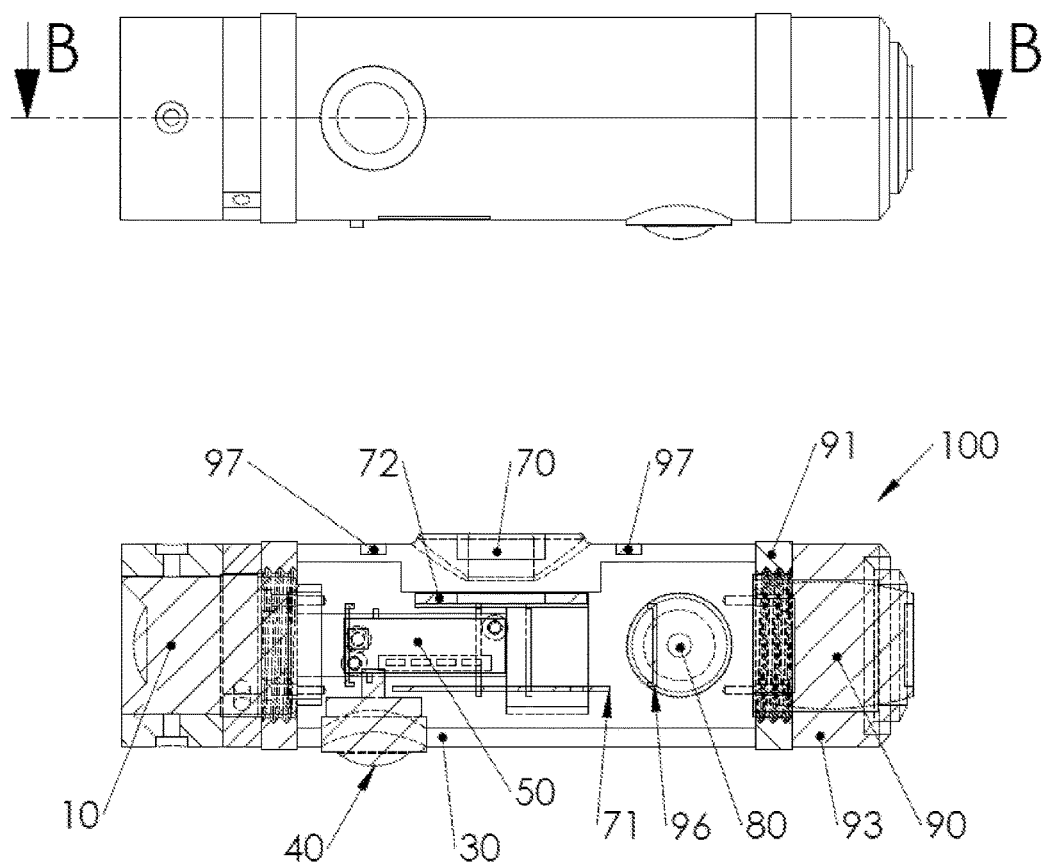
FIG. 5 is a cross sectional left half view of the wirelessly rechargeable flashlight.

Referring to FIGS. 5 and 15, the backup rear LED lamp module 90 consists of an LED light that is powered by a non-rechargeable button cell battery. The button cell battery is built into the LED lamp housing 90 in order to save space. The circuit is turned off via power switch 80 illustrated in FIG. 15 and when the battery cell is depleted, the entire module 90 may be removed from the flashlight by unscrewing the threaded end cap 91 which is fastened rigidly to the LED lamp and battery module 90 by conventional means such as adhesive or mechanical fasteners.

Figure 6:
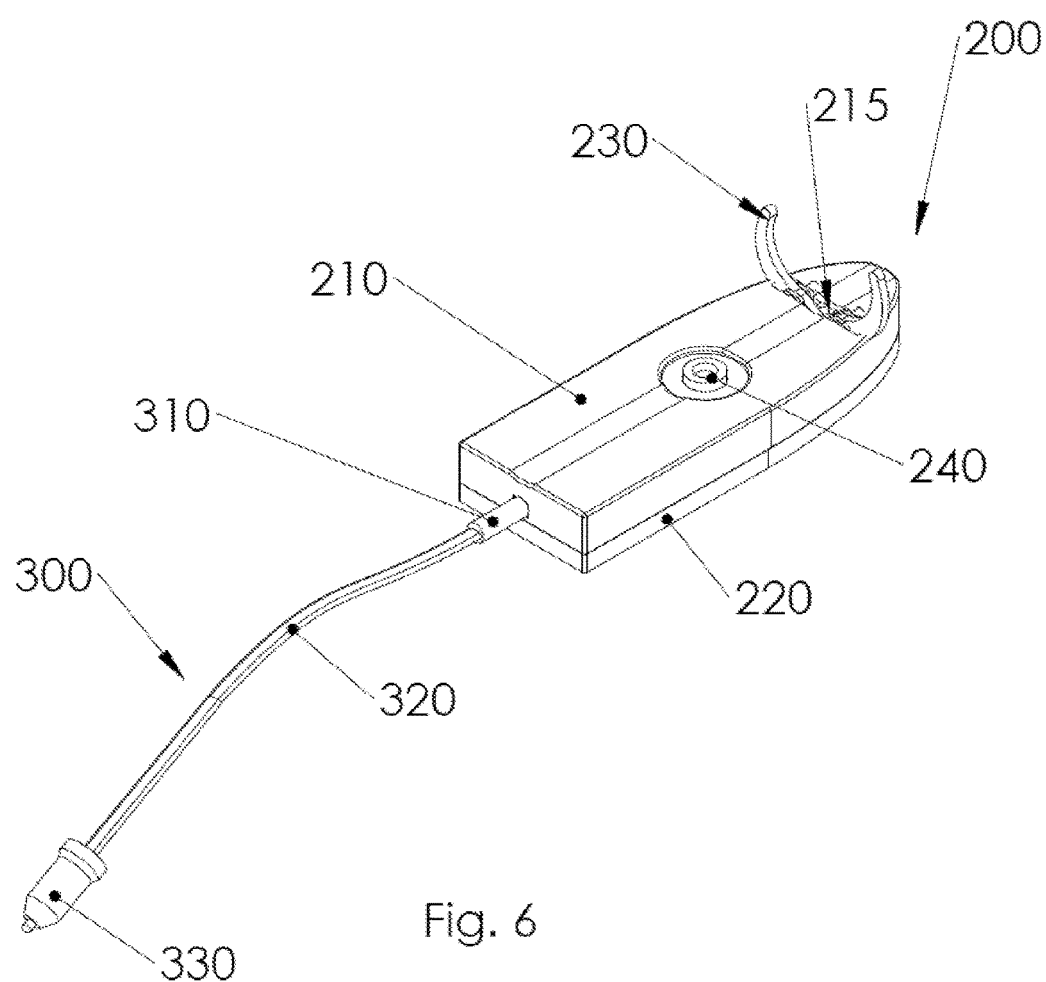
FIG. 6 is a perspective view of the wireless charger base.
Figure 7:
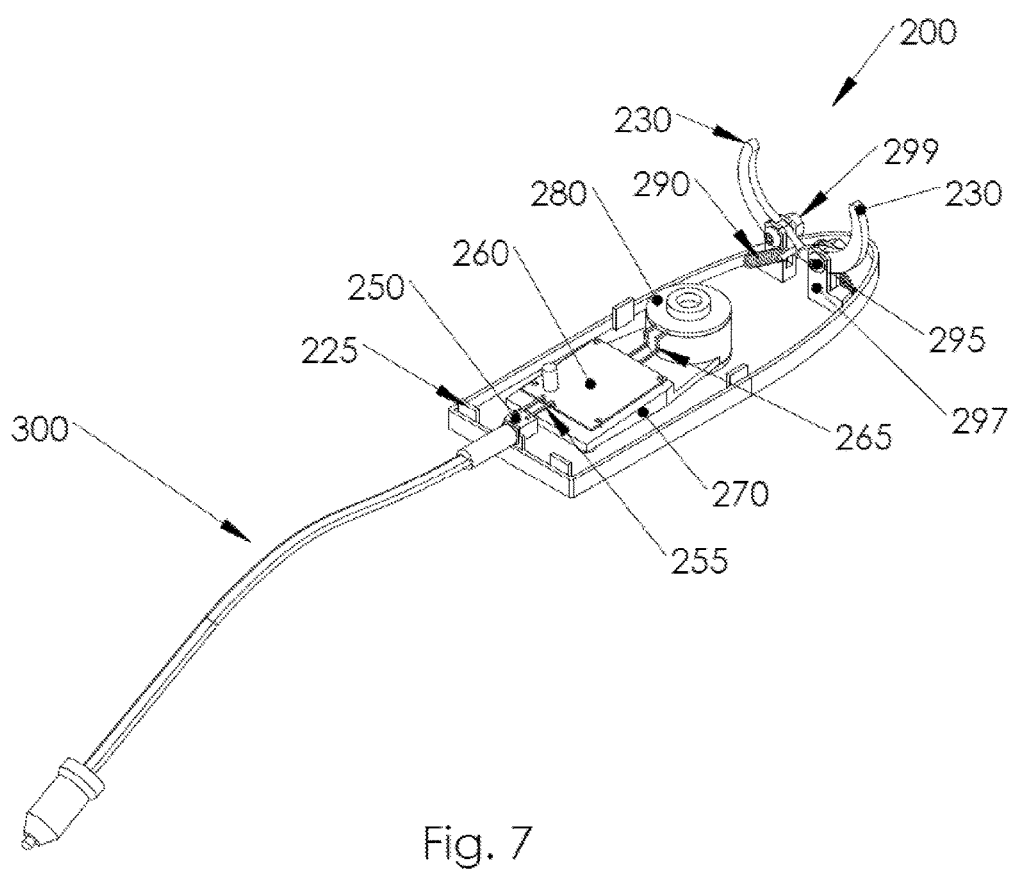
FIG. 7 is a detailed view of the of the wireless charger base shown without the top cover.

Referring next to FIGS. 6 and 7, the primary embodiment of the wireless recharging base 200 and detachable power supply cord 300 are shown. A locking arm aperture 215 is located on the top cover 210 at the front end of the charger base 200 and provides an opening for the locking arms 230 to pass through in order to grasp the flashlight 100. The wireless recharging base 200 is a housing for the wireless power electronics previously explained plus a means for securing the flashlight 100 to the base 200 while it is docked for either storage or battery recharging. In the base 200 is contained, a bottom base housing 220, a top cover 210, a power supply cord power socket connector 250, a wireless power transmitter board 260, a power transmitter coil 280, a mounting bracket 270 for mounting of the wireless coil 280 and PCB 260, a pair of flashlight clamping arms 230, a clamping arm mounting bracket 297, a set of clamping arm tension springs 290, and finally a set of fastener screws 295 and nuts 299 to secure the clamping arms to the mounting bracket. The tension springs 290 will pull the clamping arms 230 together when there is no flashlight installed and will apply a clamping force to the flashlight 100 when it is docked to the base 200. The power transmitter coil 280 is electrically connected to the power transmitter PCB 260 via connector wiring 265.

Referring again to FIGS. 6 and 7, the top cover 210 fits together with bottom plate 220 by using a plurality of alignment tabs 225 spaced around the perimeter of the bottom base plate 220. The top cover 210 further contains an aperture 240 that allows the flashlight to dock into the wireless recharging base 200. The power supply cord 300 further consists of a power connector plug 330 at its left distal end, an insulated power carrying wire 320, and a 12 VDC male connector 310 which connects to the base 200 via the female connector 250. If the cord 300 were to somehow get damaged, it may be detached from its base 200 and a replacement supply cord could be shipped to the owner. Additionally, power cords of various length 300 may be supplied in order to accommodate the needs of various users. Finally, as shown in FIG. 7, the wireless power transmitter PCB 260 is connected to the 12 VDC power connector 250 via connector wiring 255.

Figure 8:
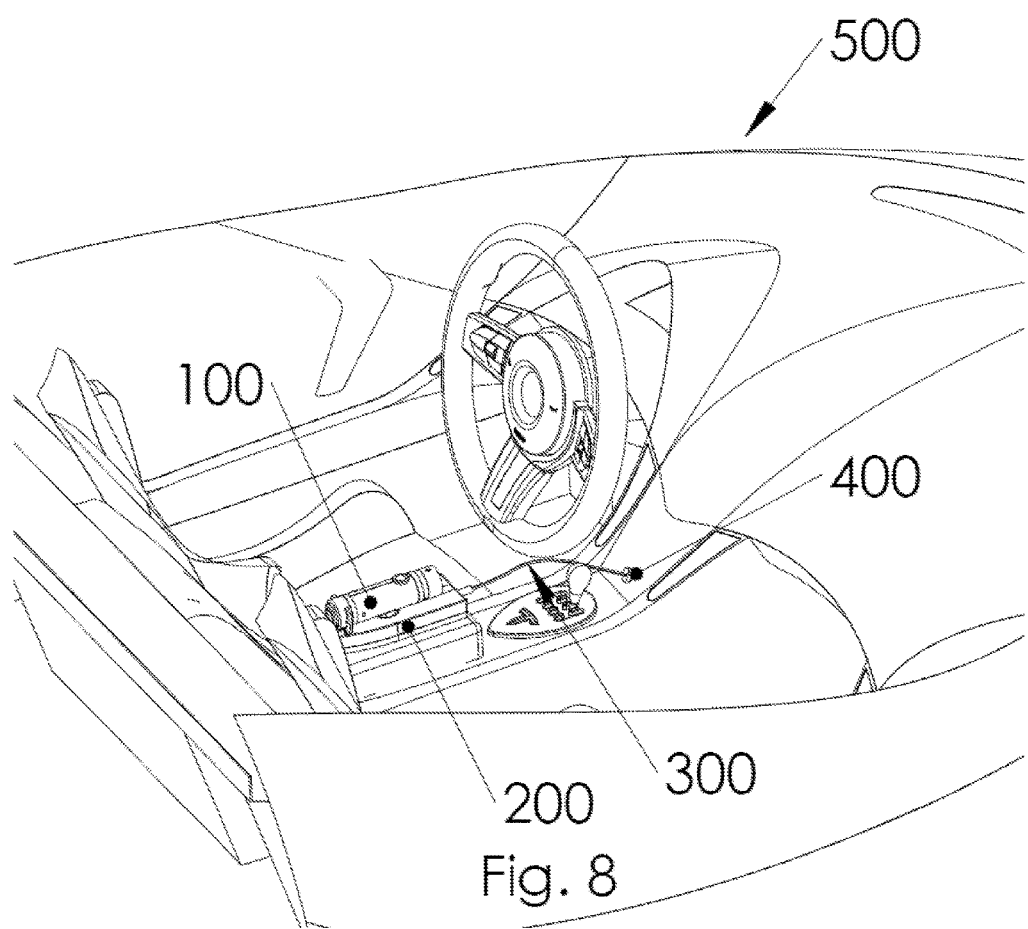
FIG. 8 is a perspective view of the wirelessly rechargeable flashlight and charger base shown in use inside an automobile.
Figure 9:
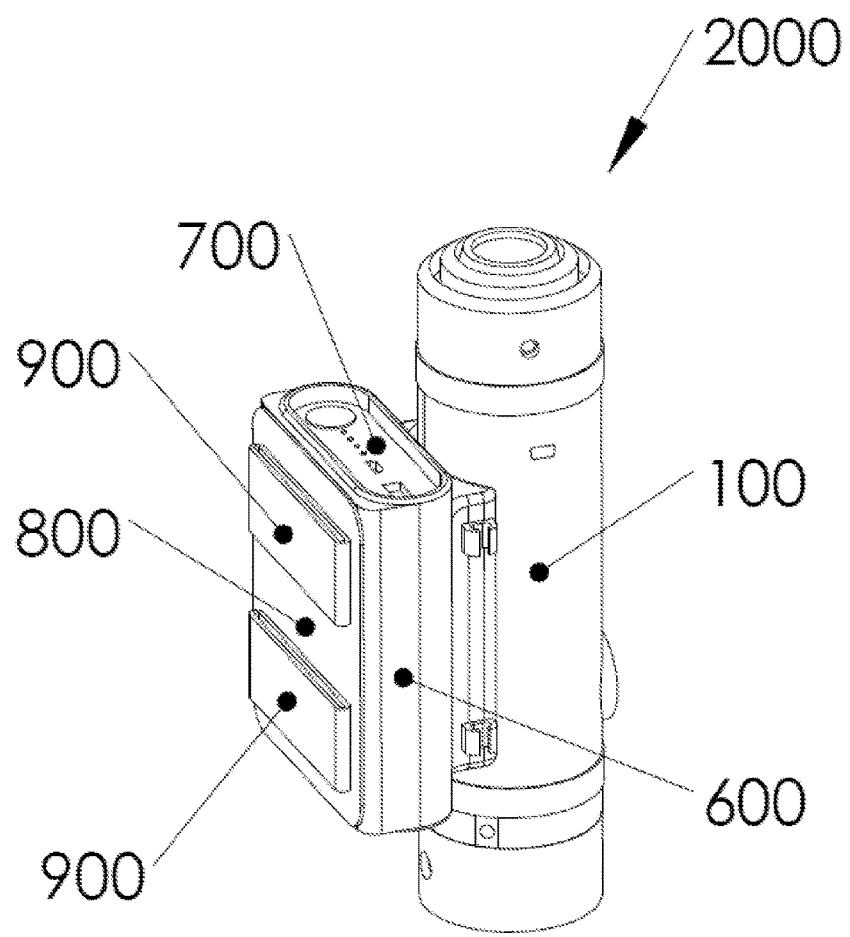
FIG. 9 is a perspective view of the secondary embodiment of the mini USB rechargeable flashlight and wearable recharger battery pack.

In reference to FIG. 8, a preferred embodiment of the wireless rechargeable flashlight 100 and base 200 is shown in an automobile interior example 500. Traditionally, automobiles offer an operator multiple power outlet points, including a traditional 12 VDC power outlet shown here as outlet 400. In the preferred embodiment, the base 200 would then receive its 12 VDC power from the automobile 12 VDC outlet 400 via the power cord 300. When not recharging, said power cord 300 may be detached from base 200 and stored inside the automobile for future use if desired. Although shown here located on the center divider between the driver and front passenger seats, the base 200 could also be located at other locations, not shown, depending on the specific vehicle design.

Referring to FIGS. 9 thru 12, the secondary embodiment 2000 of the rechargeable flashlight of the present invention shall next be discussed. In this embodiment, the flashlight user wears the flashlight 100 that is magnetically attached to a rechargeable battery pack housing 600 that is further secured to an article of clothing such as a tactical MOLLE style vest or an operator's belt. This embodiment is designed for attachment to MOLLE tactical vests; however, the usage of this embodiment is not restricted solely to tactical vests. In the preferred embodiment illustrated in FIGS. 9 and 11, the side of the battery pack housing 600 that faces toward the operator possesses a means to secure to MOLLE vests via the use of two clip straps 900 that are permanently sewn into or otherwise mechanically fastened to a back plate 800. Said back plate 800 is secured to said battery pack housing 600 by standard industry fastening methods, such as adhesives, fasteners, rivets, or screws.

Figure 10:
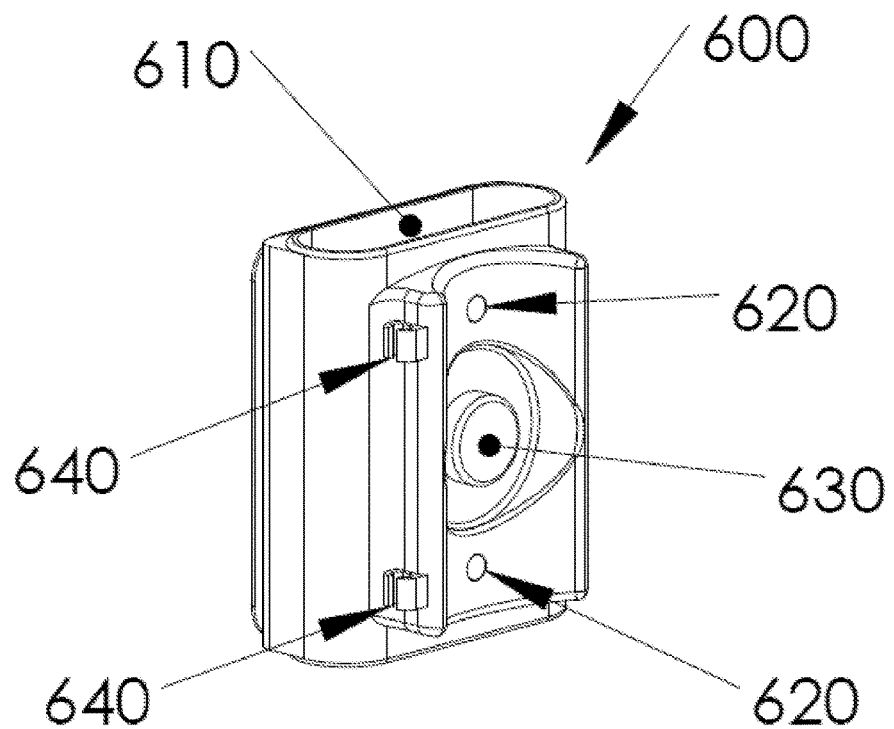
FIG. 10 is a detailed front view of the wearable recharger battery pack housing.
Figure 11:
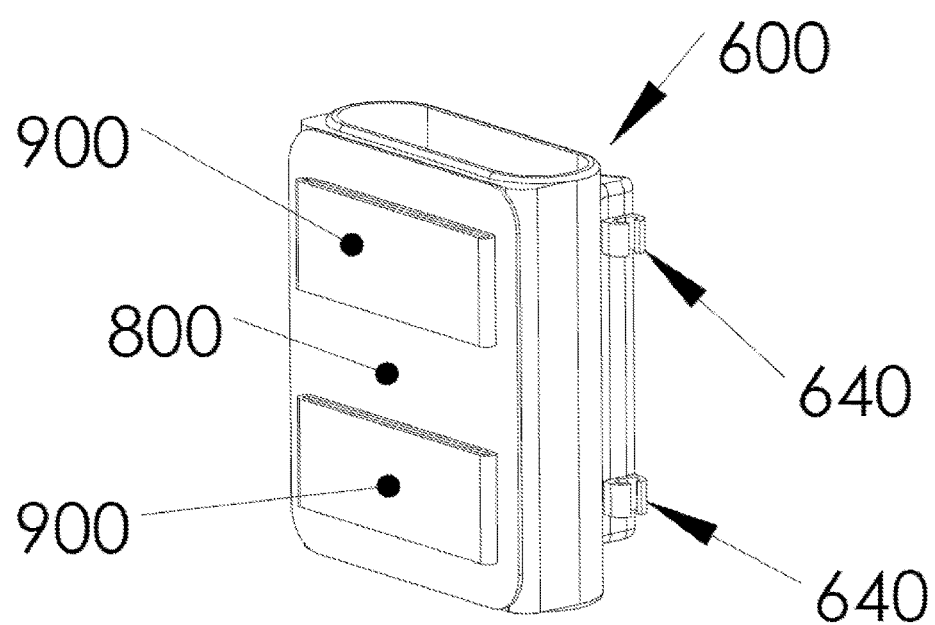
FIG. 11 is a detailed rear view of the wearable recharger battery pack housing.
Figure 12:
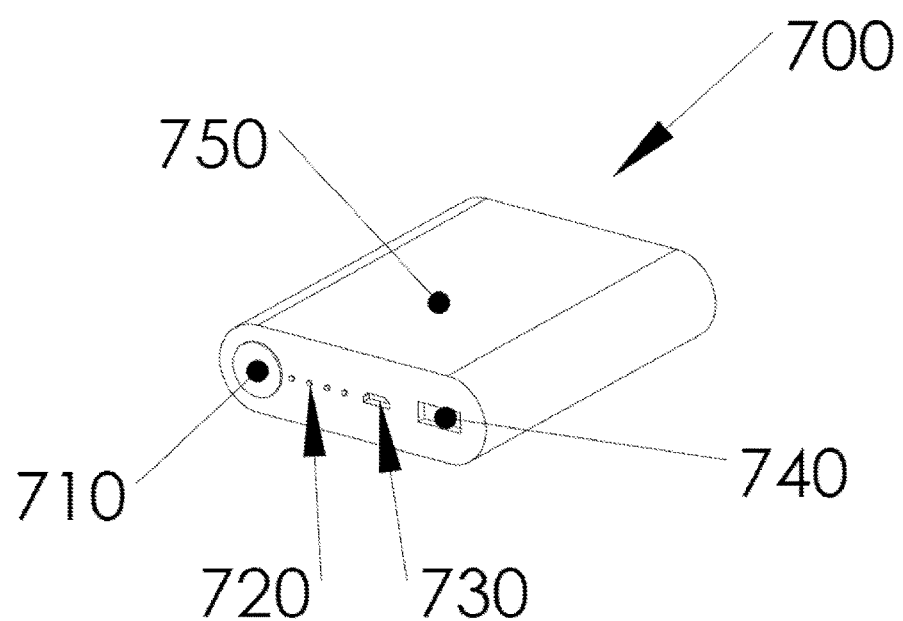
FIG. 12 is a detailed front view of the mini USB recharger battery pack.

Referring next to FIGS. 10 and 12, the battery pack housing contains a top slotted aperture 610 designed for insertion of a rechargeable battery pack 700, a set of mini USB retaining clips 640, a set of magnets 620 rigidly attached to the front concave surface of said housing 600 which are provided to magnetically attach to magnets 97 of the flashlight 100, and a central alignment post 630 that mates concentrically with the female pocket 70 of said flashlight 100. As shown in FIG. 12, the rechargeable battery pack 700 contains a power on/off switch 710, an internal battery power meter display 720, a micro USB power input (for recharging the battery pack) 730, a set of internal rechargeable batteries 750, and a USB power outlet port 740 for sending power to the flashlight 100. Although not limited to only one type of rechargeable battery inside the battery pack, a preferred battery is the rechargeable battery No. 18650 that is currently widely available in the battery technology industry.

Figure 13:
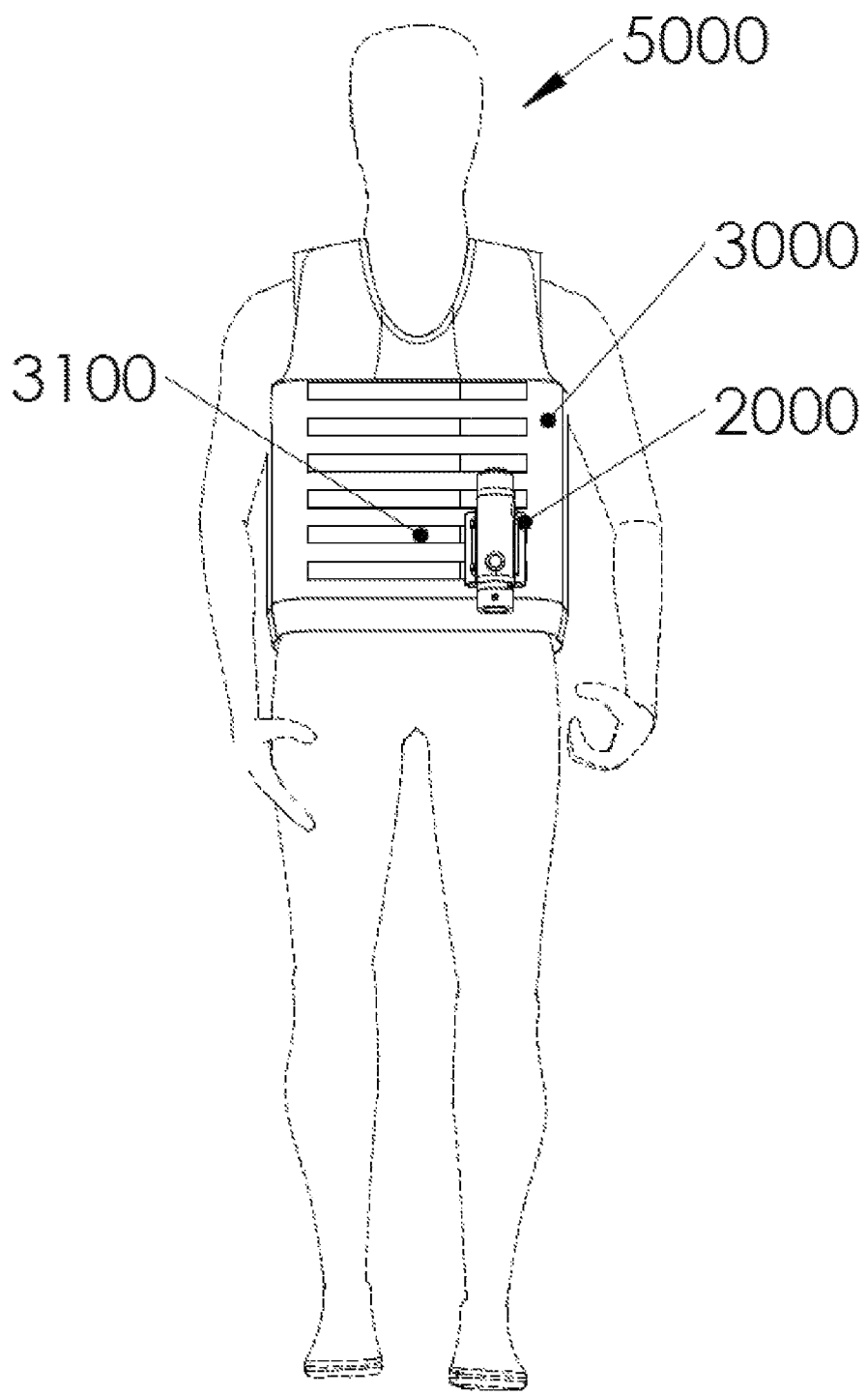
FIG. 13 is a perspective view of the mini USB rechargeable flashlight and wearable recharger battery pack shown in use on a human wearing a MOLLE style tactical vest.

Referring finally to FIG. 13, the secondary embodiment of the rechargeable flashlight 2000 is shown in use by an operator 5000 who is wearing a tactical MOLLE style vest 3000. As shown in this preferred embodiment, the tactical vest 3000 has a plurality of evenly spaced clip straps 3100 so that the rechargeable flashlight 2000 may be located in whatever position the operator selects. Although not shown in FIG. 13, one skilled in the art of using tactical vests would typically use flexible clip straps such as Malice clips to firmly secure the back of the flashlight battery pack housing to the vest.

What is claimed is:

1. A rechargeable flashlight comprising:
   a housing supporting two independently powered LED lamps;
   a first LED lamp located at the front end of said flashlight;
   a second LED lamp located at the rear end of said flashlight;
   a first power switch to turn said first LED lamp on or off;
   a rechargeable battery to provide power to said first LED lamp;
   a non-rechargeable battery to provide power to said second LED lamp;
   a second power switch to turn said second LED lamp on or off
   a battery power display meter connected to said rechargeable battery, said meter having a push button to activate said display meter and indicating the state of charge of said rechargeable battery by lighting between one and four LEDs located on said display of said meter;
   a wireless docking port, said port having a single circular blind hole at its center for mating with a separate wireless recharging device;
   a radio frequency coil and control board wired to said rechargeable battery;
   a mini USB charging port and control board wired to said rechargeable battery;
   and a set of magnets aligned along a bottom of the housing and in line with said wireless docking port.

2. A rechargeable flashlight according to claim 1 that has a separate non-rechargeable button cell battery for use in supplying power to only the rear lamp.

3. A rechargeable flashlight according to claim 1 that can be recharged wirelessly by wireless inductive recharging of the flashlight by docking the flashlight into a separate wireless charging stand.

4. A rechargeable flashlight and wireless recharging stand according to claim 3 that includes a set of spring tensioned clamping arms to secure the flashlight to the wireless recharging stand.

5. A rechargeable flashlight and wireless recharging stand according to claim 3 that includes a detachable power supply cord that connects to a 12 VDC power adapter port in a motor vehicle.

6. A rechargeable flashlight according to claim 1 that can be recharged by a USB cable connection to a separate wearable battery pack having a USB power outlet supply.

7. A rechargeable flashlight and wearable battery power pack according to claim 6 that has a housing having one side that contains at least two straps for use in securing the wearable power pack to an article of clothing.

8. A rechargeable flashlight and wearable battery pack according to claim 6, said wearable battery pack having at least two clips for use in securing a separate USB power cable.

9. A rechargeable flashlight and wearable battery pack according to claim 6, said wearable battery pack having a set of magnets mounted on a concave face for use in docking the rechargeable flashlight.

10. A wearable battery power pack according to claim 6 that has an open top aperture for use in placing a separate rechargeable battery pack.

* * * * *